(12) United States Patent
Guo et al.

(10) Patent No.: US 9,897,874 B2
(45) Date of Patent: Feb. 20, 2018

(54) PIXEL ARRAY, DISPLAY DEVICE AND DISPLAY METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Dong Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/123,795

(22) PCT Filed: Dec. 29, 2015

(86) PCT No.: PCT/CN2015/099332
§ 371 (c)(1),
(2) Date: Sep. 6, 2016

(87) PCT Pub. No.: WO2017/016169
PCT Pub. Date: Feb. 2, 2017

(65) Prior Publication Data
US 2017/0176790 A1      Jun. 22, 2017

(30) Foreign Application Priority Data

Jul. 24, 2015   (CN) .......................... 2015 1 0441016

(51) Int. Cl.
*G02F 1/1347*   (2006.01)
*G02F 1/1335*   (2006.01)
(Continued)

(52) U.S. Cl.
CPC ........ *G02F 1/1347* (2013.01); *G02F 1/13452* (2013.01); *G02F 1/133609* (2013.01);
(Continued)

(58) Field of Classification Search
CPC ........ G02B 6/005; G02B 1/11; G02B 6/0073; G02B 6/0055; G02B 6/0068
See application file for complete search history.

(56) References Cited

U.S. PATENT DOCUMENTS

| 2008/0036796 | A1  | 2/2008 | Lin et al. |
| 2010/0013848 | A1* | 1/2010 | Hekstra .................... G09G 3/20 345/589 |

(Continued)

FOREIGN PATENT DOCUMENTS

| CN | 103927946   | 7/2014 |
| CN | 104299561 A | 1/2015 |

(Continued)

OTHER PUBLICATIONS

First Chinese Office Action dated Mar. 20, 2017; Appln. No. 201510441016.0.

(Continued)

*Primary Examiner* — Donald Raleigh
(74) *Attorney, Agent, or Firm* — Ladas & Parry LLP; Loren K. Thompson

(57) ABSTRACT

A pixel array, a display device and a display method thereof are provided. The pixel array includes a plurality of pixel rows, each odd pixel row including subpixels of first color, subpixels of second color and subpixels of third color which are sequentially and repeatedly arranged, each even row including subpixels of third color, subpixels of first color and subpixels of second color which are sequentially and repeatedly arranged. For each subpixel, two opposite bases are parallel to a row direction, and an angle between two opposite sides and a direction perpendicular to the row direction is greater than 0 degree and less than or equal to 20 degrees. In adjacent pixel rows, a minimum distance of midpoints of bases of subpixels of a same color, close to a border between the adjacent pixel rows, along the row (Continued)

direction is greater than a width of one subpixel and less than or equal to a width of 3/2 subpixels.

19 Claims, 9 Drawing Sheets

(51) Int. Cl.
    *G02F 1/1343*      (2006.01)
    *G02F 1/1345*      (2006.01)
    *G09G 3/36*      (2006.01)

(52) U.S. Cl.
    CPC ..... *G02F 1/134309* (2013.01); *G09G 3/3607* (2013.01); *G09G 3/3611* (2013.01); *G09G 2320/0242* (2013.01)

(56) References Cited

U.S. PATENT DOCUMENTS

| | | |
|---|---|---|
| 2010/0039698 A1 | 2/2010 | Robinson et al. |
| 2011/0141560 A1 | 6/2011 | Kim et al. |
| 2012/0139965 A1* | 6/2012 | Yang .................... G09G 3/3225 345/690 |
| 2014/0078025 A1* | 3/2014 | Allio .................. G02B 27/2214 345/55 |
| 2016/0300519 A1 | 10/2016 | Shi et al. |
| 2016/0322432 A1* | 11/2016 | Yang .................... H01L 27/3218 |

FOREIGN PATENT DOCUMENTS

| | | |
|---|---|---|
| CN | 104614909 | 5/2015 |
| CN | 104641279 A | 5/2015 |
| CN | 104680949 A | 6/2015 |
| CN | 104681001 A | 6/2015 |
| CN | 104978920 A | 10/2015 |

OTHER PUBLICATIONS

International Search Report and Written Opinion dated Apr. 25, 2016: PCT/CN2015/099332.

The Second Chinese Office Action dated Aug. 22, 2017; Appln. 201510441016.0.

* cited by examiner

PIXEL ARRAY, DISPLAY DEVICE AND DISPLAY METHOD THEREOF

TECHNICAL FIELD

Embodiments of the present invention relate to a pixel may, a display device and a display method thereof.

BACKGROUND

The current conventional pixel design of displays is red, green and blue (RGB) design or red, green, blue and white (RGBW) design, in which three or four subpixels are combined into a pixel for display, and the physical resolution is the actual resolution. But with the increased experience requirement on display screens, the pixel density of panels is continuously increased by panel manufacturers and challenges limits from design to the manufacturing process. When the process reaches the maximum limit, other technology or design is required to increase the experience resolution of the human eyes.

SUMMARY

An embodiment of the invention provides a pixel array, comprising a plurality of pixel rows, each odd pixel row including subpixels of first color, subpixels of second color and subpixels of third color which are sequentially and repeatedly arranged, each even row including subpixels of third color, subpixels of first color and subpixels of second color which are sequentially and repeatedly arranged, wherein each subpixel is of a parallelogram shape, in which two opposite bases are parallel to a row direction, and an angle between two opposite sides and a direction perpendicular to the row direction is greater than 0 degree and less than or equal to 20 degrees; and in adjacent pixel rows, a minimum distance of midpoints of bases of subpixels of a same color, close to a border between the adjacent pixel rows, along the row direction is greater than a width of one subpixel and less than or equal to a width of 3/2 subpixels.

In some examples, in the adjacent pixel rows, the minimum distance of the midpoints of the bases of the subpixels of the same color, close to the border between the adjacent pixel rows, along the row direction is the width of 3/2 subpixels or a width of 4/3 subpixels.

In some examples, the pixel array is divided into a plurality of pixel units, and each pixel unit includes one subpixel, one and a half subpixels adjacent to each other in the row direction, or two subpixels adjacent to each other in the row direction.

In some examples, each pixel unit includes one and a half subpixels, and a ratio of a length of a side of each subpixel parallel to the row direction to a length of a sloping side is 1:1.5.

In some examples, each pixel unit includes two subpixels, and a ratio of a length of a side of each subpixel parallel to the row direction to a length of a sloping side is 1:2.

In some examples, each pixel unit includes one subpixel, and a ratio of a length of a side of each subpixel parallel to the row direction to a length of a sloping side is 1:1.

In some examples, the angle between a sloping side of each subpixel and the direction perpendicular to the row direction is 5-15 degrees.

In some examples, the subpixels of first color, the subpixels of second color and the subpixels of third color have different colors which are respectively red, green and blue.

In some examples, the sides of the subpixels in the pixel array have a same inclined direction.

An embodiment of the invention provides a display device, comprising the pixel array as mentioned above.

An embodiment of the invention provides a display method of a display device, the display device including a pixel array which includes a plurality of pixel rows, each odd pixel row including subpixels of first color, subpixels of second color and subpixels of third color which are sequentially and repeatedly arranged, each even row including subpixels of third color, subpixels of first color and subpixels of second color which are sequentially and repeatedly arranged, wherein each subpixel is of a parallelogram shape, in which two opposite bases are parallel to a row direction, and an angle between two opposite sides and a direction perpendicular to the row direction is greater than 0 degree and less than or equal to 20 degrees; in adjacent pixel rows, a minimum distance of midpoints of bases of subpixels of a same color, close to a border between the adjacent pixel rows, along the row direction is greater than a width of one subpixel and less than or equal to a width of 3/2 subpixels; and wherein, the pixel array is divided into a plurality of pixel units, and each pixel unit includes at least one subpixel; and the display method comprises: sequentially selecting a subpixel in the pixel array to be a target subpixel; selecting a quadrangle, formed by connecting midpoints of sloping sides of two subpixels adjacent to the target subpixel in the row direction, away from the target subpixel and midpoints of shared sloping sides of subpixels, adjacent to the target subpixel, in two pixel rows adjacent to the target subpixel, to be a sampling area, in which the sampling area is overlapped with a plurality of pixel units; and calculating actual display information of the target subpixel according to an area ratio of each pixel unit in the sampling area and display information with a color the same as that of the target subpixel in each pixel unit.

In some examples, in selecting the sampling area for the target subpixel, sampling areas of adjacent subpixels are partially overlapped.

In some examples, the actual display information of the target subpixel is calculated according to the following formula:

$$P = \sum_{i=1}^{n} p_i \frac{a_i}{A},$$

in which P refers to the actual display information of the target subpixel; n refers to a number of pixel units in the sampling area; A refers to an area of the sampling area; $a_i$ refers to an area of each pixel unit falling into the sampling area; and $p_i$ refers to image display information with a color the same as that of the target subpixel in each pixel unit.

In some examples, the display method further includes: after calculating the actual display information of each target subpixel, applying corresponding voltage to each target subpixel for image display.

In some examples, each pixel unit is allocated with display information of first color, display information of second color and display information of third color according to an image to be displayed.

In some examples, the display information of first color, the display information of second color and the display information of third color are respectively brightness of corresponding color.

In some examples, the subpixels of first color, the subpixels of second color and the subpixels of third color have different colors which are respectively red, green and blue.

In some examples, the actual display information of each subpixel in the pixel array, except subpixels disposed on an edge of the pixel array, is calculated according to the sampling area.

In some examples, each pixel unit includes one subpixel, one and a half subpixels adjacent to each other in the row direction, or two subpixels adjacent to each other in the row direction.

In some examples, the sides of the subpixels in the pixel array have a same inclined direction.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

Figure 1:
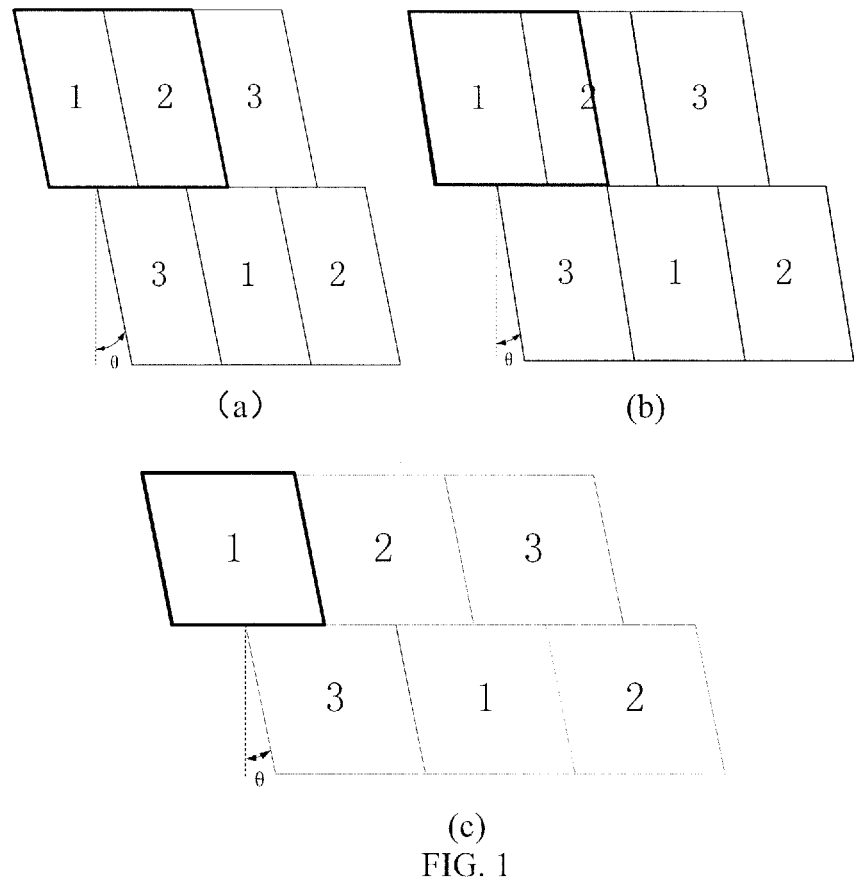
FIG. 1 is a schematic diagram of inclined subpixels in the embodiment of the present invention.

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise specified, the technical terms or scientific terms used here have normal meanings understood by those skilled in the art. The words "first", "second" and the like used in the description and the claims of the patent application of the present invention do not indicate the sequence, the number or the importance but are only used for distinguishing different components. Similarly, the words "a", "an" and the like also do not indicate the number but only indicate at least one.

Some embodiments of the present invention provide an abnormal delta pixel array. In the pixel array, each subpixel is inclined. Inclination here refers to that: each subpixel is in the shape of a parallelogram; two opposite sides (bases) of each subpixel are parallel to the row direction of the pixel array; and the other two opposite sides (sides) are intercrossed with the row direction and not perpendicular to the row direction. That is to say, the two sides are sloping sides and inclined towards the direction perpendicular to the row direction. In addition, in adjacent pixel rows, the minimum distance of midpoints of bases of the same color subpixels close to a border between the adjacent pixel rows, along the row direction, is greater than the width of one subpixel and less than or equal to the width of 3/2 subpixels. The width of the subpixel refers to the length of a side of each subpixel parallel to the row direction. The pixel array includes subpixels of first color, subpixels of second color and subpixels of third color. In each odd pixel row, the subpixels of first color, the subpixels of second color and the subpixels of third color are sequentially and repeatedly arranged. In each even row, the subpixels of third color, the subpixels of first color and the subpixels of second color are sequentially and repeatedly arranged.

In the pixel array provided by the present invention, as each subpixel is inclined and arranged in the form of the above delta array, the problem of chromatic aberration can be improved and the viewing angle can be increased. In addition, the pixel array provided by the embodiment of the present invention is cooperated with the following method for setting the sampling area and corresponding display method, provided by the embodiment of the present invention, so that pixels in the sampling area can be more uniformly distributed. The initial image information can be better recovered in the pixel borrowing process via the virtual display technology, and hence the image display quality can be improved.

More detailed description will be given below to the pixel array and the display method thereof, provided by the embodiment of the present invention, with reference to some embodiments.

FIG. 1 is a schematic diagram of inclined subpixels in the embodiment of the present invention. As illustrated in FIG. 1, each subpixel is in the shape of a parallelogram. For the convenience of description, the row direction of subpixel arrangement is referred to as the first direction, and the direction perpendicular to the first direction is referred to as the second direction. As seen from FIG. 1, the subpixels in the embodiment of the present invention include subpixels of first color, subpixels of second color and subpixels of third color, which are respectively marked as "1", "2" and "3" in the accompanying drawings. For instance, the first color, the second color and the third color may be respectively red, green and blue. However, the embodiment of the present invention is not limited thereto. For instance, the first color, the second color and the third color may be respectively red, blue and green; the first color, the second color and the third color may be respectively blue, green and red; the first color, the second color and the third color may be respectively blue, red and green; the first color, the second color and the third color may be respectively green, blue and red; and the first color, the second color and the third color may be respectively green, red and blue. In addition, except red, green and blue, the first color, the second color and the third color may also be selected from a combination of magenta, cyan and yellow.

As illustrated in FIG. 1, the angle θ between the sloping side of each subpixel and the second direction is greater than 0 degree and less than or equal to 20 degrees. For instance, the angle may be 5-15 degrees or 8-12 degrees. In addition, although the case that each subpixel is inclined towards the left is schematically illustrated in the figure, the embodiment of the present invention is not limited thereto, and each subpixel may be inclined towards the right. That is to say, each subpixel may be inclined towards two opposite directions in the row direction of pixel arrangement. However, the subpixels in the pixel array have same inclined direction. That is to say, the sloping sides of all the subpixels are inclined towards the left or inclined towards the right relative to the second direction, and the angle of inclination is the same.

In the traditional RGB display, three rectangular subpixels are usually combined into a square pixel unit. Thus, the ratio of the long side to the short side of each subpixel is 3:1. The embodiment of the present invention adopts the design method of virtual pixels. As illustrated in FIG. 1(a), two subpixels adjacent to each other in the first direction correspond to one pixel unit (illustrated by the heavy line box); or as illustrated in FIG. 1(b), one and a half subpixels adjacent to each other in the first direction correspond to one pixel unit (illustrated by the heavy line box); or as illustrated in FIG. 1(c), one subpixel corresponds to one pixel unit (illustrated by the heavy line box). By adoption of the pixel design method, in the case of same display resolution, the number of required subpixels will be correspondingly reduced, and hence the number of required metal wirings in the column direction will be reduced. In the case of same number of subpixels, compared with the proposal that three subpixels are combined into one pixel unit, the display resolution can be increased.

In addition, in order to form the shape (e.g., diamond) of two pixel units with the same length in adjacent sides, in the case as illustrated in FIG. 1(a), the ratio of the short side to the long side of each subpixel may be 1:2; in the case as illustrated in FIG. 1(b), the ratio of the short side to the long side of each subpixel may be 1:1.5; and in the case as illustrated in FIG. 1(c), four sides of the subpixel have equal length. For the convenience of description, the length of a side of each subpixel along the first direction is referred to as the width of the subpixel. That is to say, in the case as illustrated in FIGS. 1(a) and 1(c), the width of the subpixel is the length of the short side; and in the case as illustrated in FIG. 1(c), the width of the subpixel is the length of any side.

Figure 2:
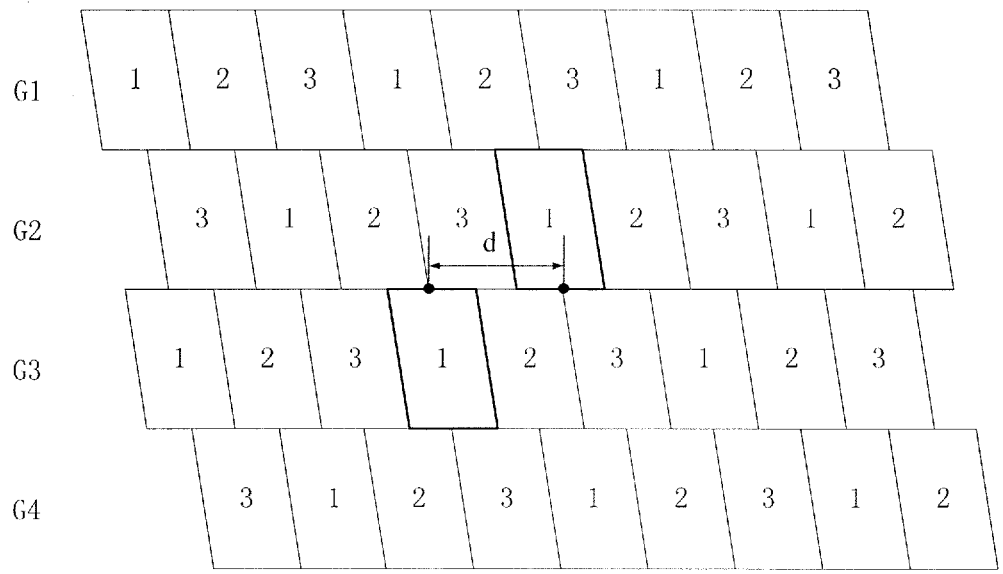
FIG. 2 is a schematic diagram illustrating the arrangement of subpixels in a pixel array provided by the embodiment of the present invention.

FIG. 2 is a schematic diagram illustrating the arrangement of subpixels in the pixel array provided by the embodiment of the present invention. The pixel array provided by the embodiment of the present invention includes a plurality of pixel rows. FIG. 2 illustrates four pixel rows G1, G2, G3 and G4. However, it should be noted that the pixel array in the figure is only illustrative and the pixel array provided by the embodiment of the present invention is not limited to the number of rows in the figure and the number of subpixels in each row. For instance, the odd rows G1 and G3 include subpixels of first color, subpixels of second color and subpixels of third color which are sequentially and repeatedly arranged, and the even rows G2 and G4 include subpixels of third color, subpixels of first color and subpixels of second color which are sequentially and repeatedly arranged. For instance, in the pixel array, the arrangement sequence of each odd row of subpixels is the subpixel of first color, the subpixel of second color, the subpixel of third color, the subpixel of first color, the subpixel of second color, the subpixel of third color . . . . That is to say, the subpixel of first color, the subpixel of second color and the subpixel of third color, which are sequentially arranged, are taken as a repeating unit and repeatedly arranged in the row direction. The arrangement sequence of each even row is the subpixel of third color, the subpixel of first color, the subpixel of second color, the subpixel of third color, the subpixel of first color, the subpixel of second color . . . . That is to say, the subpixel of third color, the subpixel of first color and the subpixel of second color, which are sequentially arranged, are taken as a repeating unit and repeatedly arranged in the row direction.

As illustrated in FIG. 2, the width of ½ subpixel is staggered between the pixel rows G1 and G2, and the width of ½ subpixel is also staggered between G3 and G4. However, the embodiment of the present invention is not limited thereto. The staggered distance may be greater than the width of 0 subpixel and less than or equal to the width of ½ subpixel. As illustrated in FIG. 2, two subpixels of first color in adjacent pixel rows are drawn by heavy lines, and the distance (the distance along the row direction) of midpoints of bases of the subpixels close to the border between the pixel rows G2 and G3, is d. It can be seen by considering all the subpixels with the same color in the two adjacent pixel rows that the minimum distance between midpoints of bases of the same color subpixels close to the base of the border between the adjacent pixel rows, is greater than the width of one subpixel and less than or equal to the width of 3/2 subpixels. Actually, the distance is staggered to form the above delta pixel arrangement mode. The staggered means can prevent the subpixels of the same color in adjacent rows from forming overlapped areas in the row direction. Therefore, the arrangement mode provided by the embodiment of the present invention may be that: in the adjacent pixel rows, the minimum distance between the midpoints of the bases of the same color subpixels close to the border between the adjacent pixel rows, along the row direction, is greater than the width of one subpixel and less than or equal to the width of 3/2 subpixels, and is not limited to the specific staggered distance of the adjacent pixel rows as illustrated in the figure. For instance, in adjacent pixel rows, the minimum distance between the midpoints of the bases of the same color subpixels close to of the border between the adjacent pixel rows, along the row direction, is the width of 3/2 subpixels or the width of 4/3 subpixels. For instance, the angle θ between the sloping side of each subpixel and the direction perpendicular to the row direction is greater than 0 degree and less than or equal to 20 degrees. For instance, the angle may be 5-15 degrees or 8-12 degrees.

As described above, in the embodiment of the present invention, each subpixel is inclined and arranged in the form of the delta array, the problem of chromatic aberration can be improved and the viewing angle can be increased. In addition, the pixel array provided by the embodiment of the present invention is cooperated with the design and display methods of the following sampling area provided by the embodiment of the present invention, so that pixels in the sampling area can be more uniformly distributed. The initial image information can be better recovered in the pixel borrowing process via the virtual display technology, and hence the image display quality can be improved. Detailed description will be given below to the design and display methods of the sampling area provided by the embodiment of the present invention.

As described above, in the traditional display mode, three subpixels RGB or four subpixels RGBW are usually adopted to form a pixel. Thus, each pixel includes three primary colors for forming various colors. However, in the display method provided by the embodiment of the present invention, one subpixel, one and a half subpixels or two subpixels are combined into a virtual pixel unit, so each pixel unit does not include the three primary colors actually. Thus, each pixel unit will borrow subpixels in peripheral pixel units to display.

In the display method provided by the embodiment of the present invention, a quadrangular sampling area is adopted and subpixels adjacent to a target subpixel in the row direction and the column direction are shared. Firstly, a target subpixel is selected, and a quadrangle, formed by connecting midpoints of sloping sides of two subpixels adjacent to the target subpixel in the row direction, away from the target subpixel and midpoints of shared sloping sides of subpixels, adjacent to the target subpixel, in two pixel rows adjacent to the target subpixel, is selected as the sampling area. The sampling area may include a plurality of pixel units. "Include" here indicates that at least one part of the pixel unit falls into the sampling area. For instance, some pixel units may completely fall within the scope of the sampling area, and partial areas of some pixel units fall into the sampling area. Description will be given below by taking the case that one and a half subpixels are taken as one pixel unit as an example, on the basis of the pixel array provided by the embodiment of the present invention.

Figure 3:
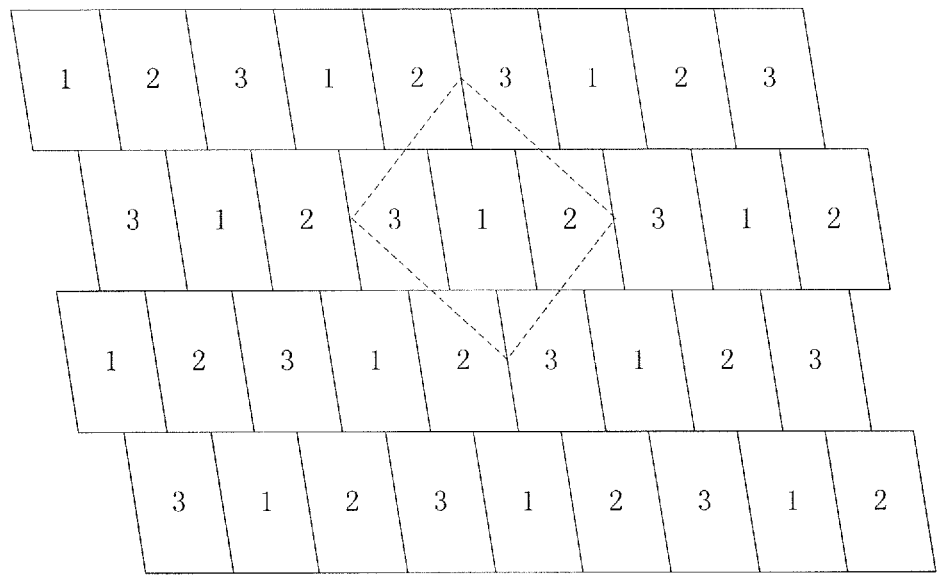
FIG. 3 is a schematic diagram of a sampling area of a subpixel of first color in an even row.

FIG. 3 illustrates a sampling area (illustrated by a dotted line box) of a subpixel of first color in an even row. As illustrated in FIG. 3, the sampling area is a quadrangle. The quadrangle is obtained by the following means: selecting midpoints of outer sides (sloping sides) of two subpixels (namely a subpixel of third color on the left and a subpixel of second color on the right) adjacent to the left and the right of a target subpixel (the subpixel of first color in the dotted line box) in the same row, namely the midpoints of the sloping sides of the adjacent subpixel of third color and the adjacent subpixel of second color, away from the target subpixel; and secondly, selecting midpoints of shared sloping sides of subpixels, adjacent to the target subpixel, in adjacent rows of the target subpixel, namely a midpoint of a shared sloping side of an adjacent subpixel of second color and an adjacent subpixel of third color above the target subpixel in the first pixel row and a midpoint of a shared sloping side of an adjacent subpixel of second color and an adjacent subpixel of third color beneath the target subpixel in the third pixel row. After the midpoints of the four sides are selected, the four midpoints are connected by line sections to form the sampling area of the subpixel of first color (the target subpixel) as illustrated in FIG. 3. That is to say, the quadrangle, formed by connecting the midpoints of the sloping sides of the two subpixels adjacent to the target subpixel in the row direction, away from the target subpixel, and the midpoints of the shared sloping sides of the subpixels, adjacent to the target subpixel, in the two pixel rows adjacent to the target subpixel, is selected as the sampling area.

Figure 4:
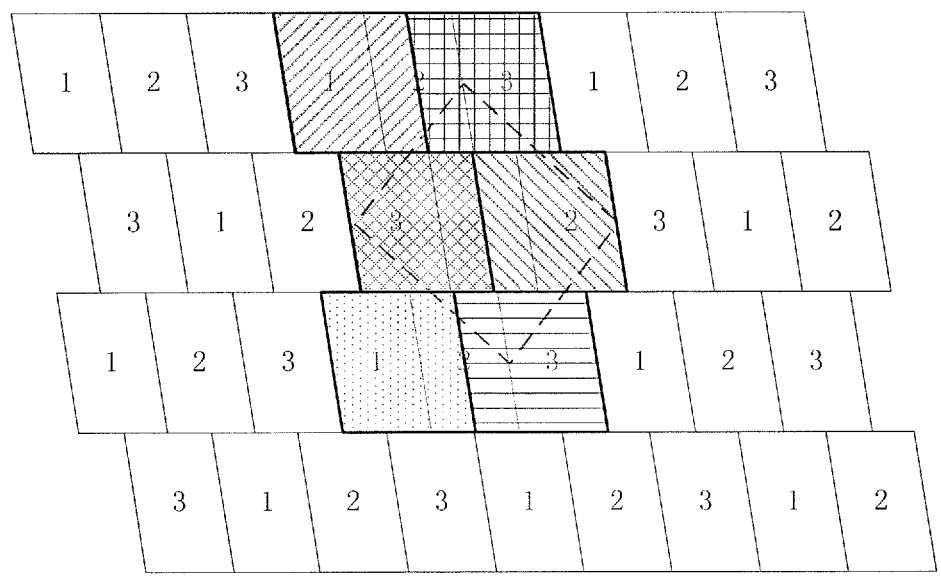
FIG. 4 is a schematic diagram of pixel units in the sampling area as illustrated in FIG. 3.

FIG. 4 is a schematic diagram of pixel units in the sampling area as illustrated in FIG. 3 (taking the case that one and a half subpixels are taken as one pixel unit as an example). As illustrated in FIG. 4, the pixel units having overlapped areas with the sampling area are illustrated by heavy lines, in which different pixel units are filled with different patterns for distinguishing. Two pixel units are disposed in an adjacent row above the target subpixel (the subpixel of first color in the second row); two pixel units are disposed in the row provided with the target subpixel; and two pixel units are disposed in an adjacent row beneath the target subpixel. Thus, as for the subpixel of first color in the even row, 6 pixel units in total fall within the scope of the sampling area. The sampling area of the target subpixel is used for calculating the display information of a color the same color as that of the target subpixel in pixel units in the process of calculating the display information of the target subpixel. More detailed description will be given in the following display method.

Figure 5:
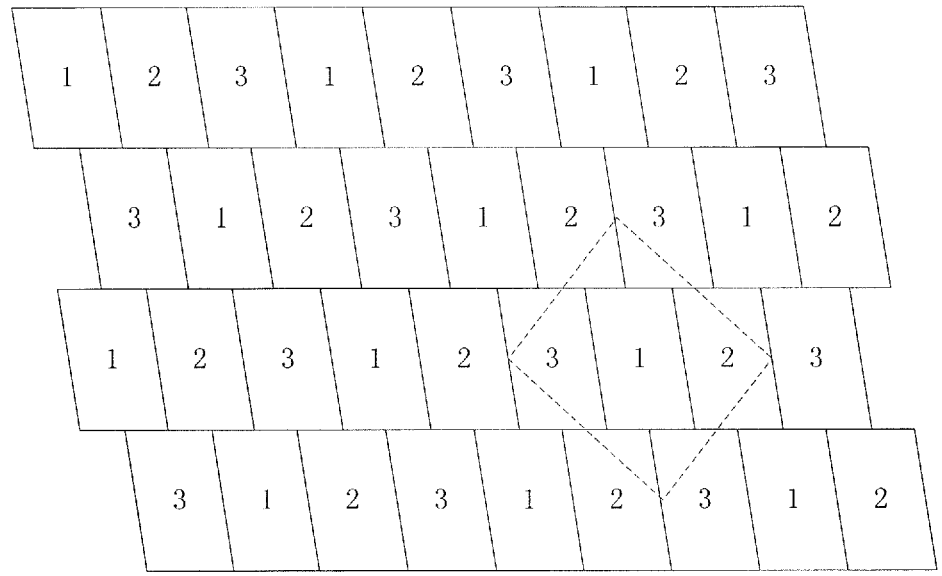
FIG. 5 is a schematic diagram of a sampling area of a subpixel of first color in an odd row.

FIG. 5 illustrates a sampling area (illustrated by a dotted line box) of a subpixel of first color in an odd row. As illustrated in FIG. 5, the sampling area is a quadrangle. The division means of the sampling area is similar to the division means of the sampling area of the subpixel of first color in the even row as illustrated in FIG. 3. No further description will be given here. That is to say, a quadrangle, formed by the connection of midpoints of sloping sides of two subpixels adjacent to the target subpixel in the row direction, away from the target subpixel and midpoints of shared sloping sides of subpixels, adjacent to the target subpixel, in two pixel rows adjacent to the target subpixels, is selected as the sampling area.

Figure 6:
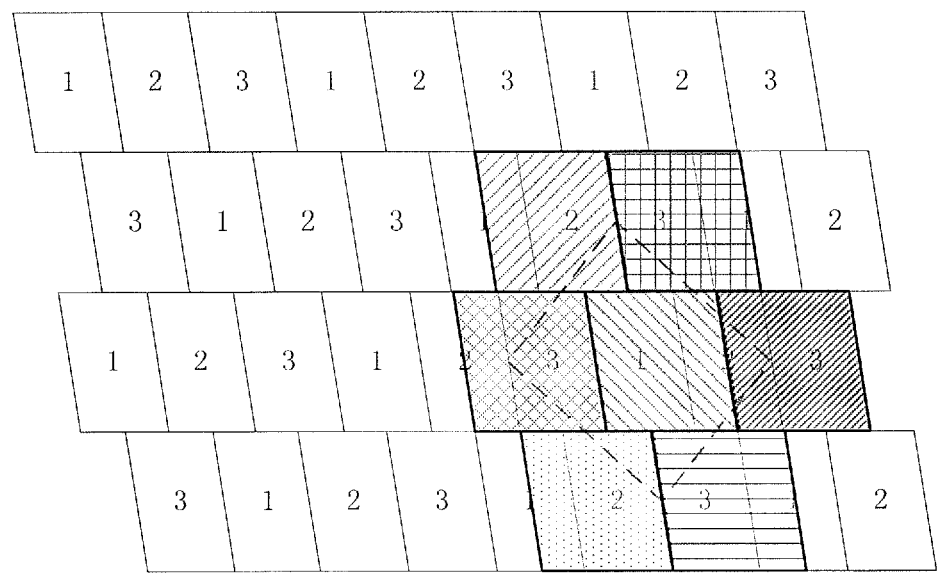
FIG. 6 is a schematic diagram of pixel units in the sampling area as illustrated In FIG. 5.

FIG. 6 is a schematic diagram of pixel units in the sampling area as illustrated in FIG. 5 (taking the case that one and a half subpixels are taken as one pixel unit as an example). As illustrated in FIG. 6, pixel units having overlapped areas with the sampling area are illustrated by heavy lines, in which different pixel units are filled with different patterns for distinguishing. Two pixel units are disposed in an adjacent row above the target subpixel; three pixel units are disposed in the row provided with the target subpixel; and two pixel units are disposed in an adjacent row beneath the target subpixel. Thus, as for the subpixel of first color in the even row, 7 pixel units in total fall within the scope of the sampling area.

Figure 7:
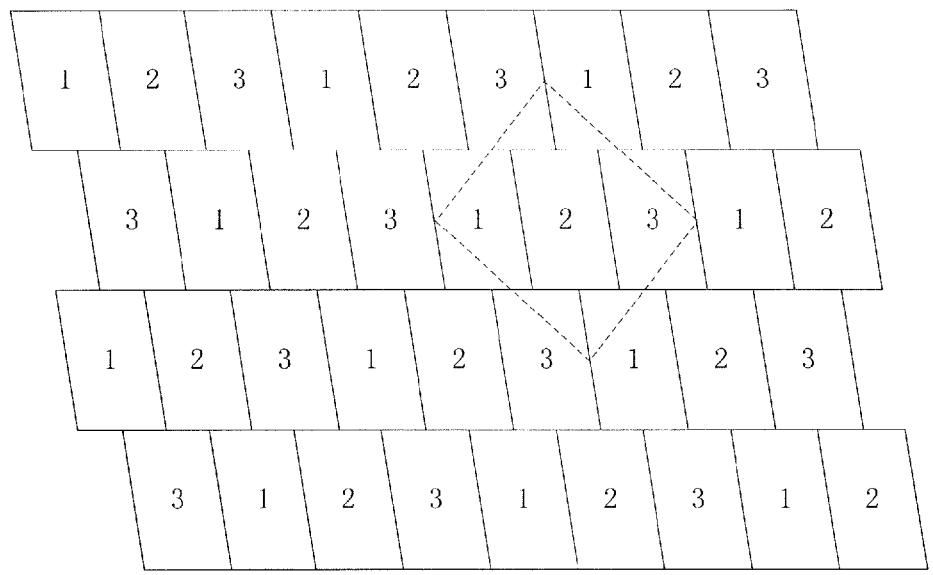
FIG. 7 is a schematic diagram of a sampling area of a subpixel of second color in an even row.

FIG. 7 illustrates a sampling area (illustrated by a dotted line box) of a subpixel of second color in an even row. As illustrated in FIG. 7, the sampling area is a quadrangle. The division means of the sampling area is similar to the division means of the sampling area of the subpixel of first color in the even row as illustrated in FIG. 3. No further description will be given here. That is to say, a quadrangle, formed by the connection of midpoints of sloping sides of two subpixels adjacent to the target subpixel in the row direction, away from the target subpixel and midpoints of shared sloping sides of subpixels, adjacent to the target subpixel, in two pixel rows adjacent to the target subpixels, is selected as the sampling area.

Figure 8:
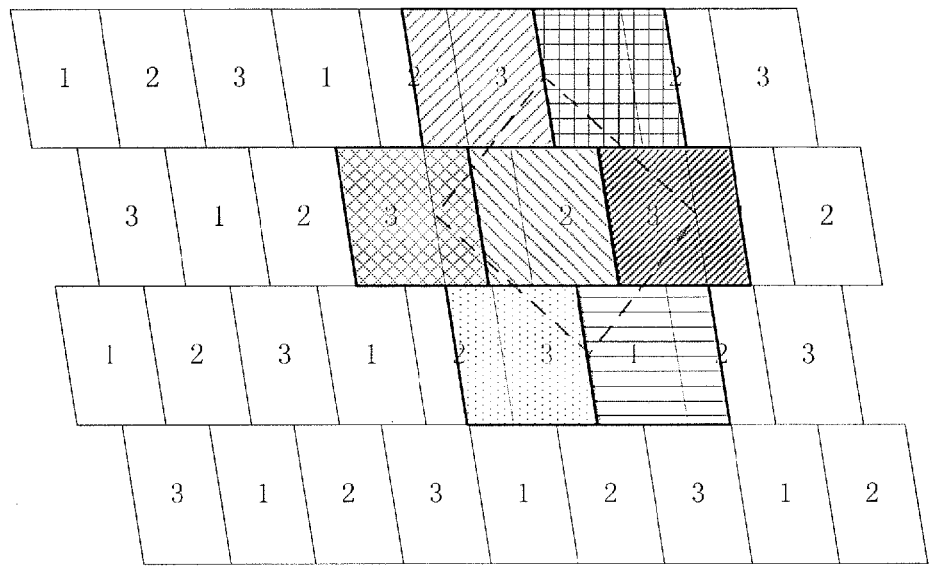
FIG. 8 is a schematic diagram of pixel units in the sampling area as illustrated in FIG. 7.

FIG. 8 is a schematic diagram of pixel units in the sampling area as illustrated in FIG. 7 (taking the case that one and a half subpixels are taken as one pixel unit as an example). As illustrated in FIG. 8, pixel units having overlapped areas with the sampling area are illustrated by heavy lines, in which different pixel units are filled with different patterns for distinguishing. Two pixel units are disposed in an adjacent row above the target subpixel; three pixel units are disposed in the row provided with the target subpixel; and two pixel units are disposed in an adjacent row beneath the target subpixel. Thus, as for the subpixel of second color in the even row, 7 pixel units in total fall within the scope of the sampling area.

Figure 9:
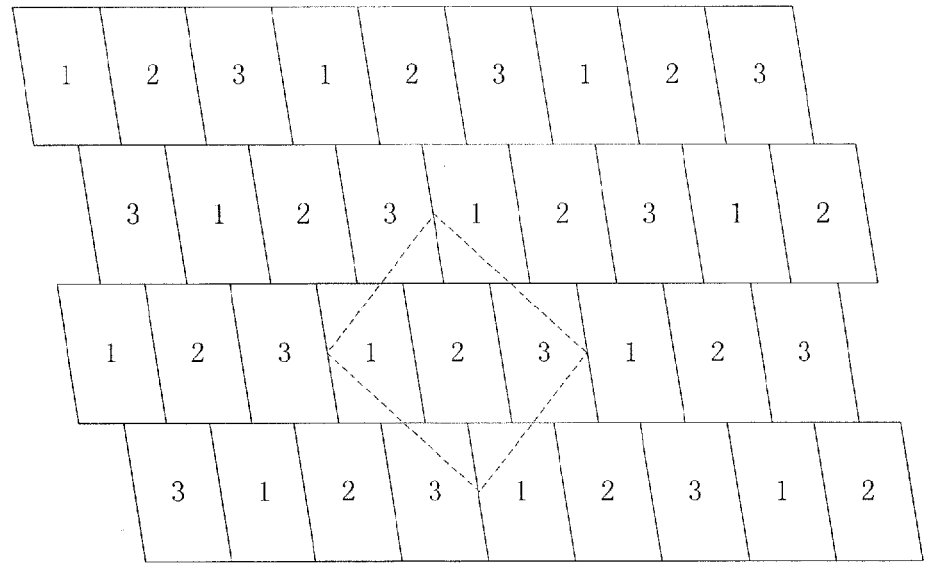
FIG. 9 is a schematic diagram of a sampling area of a subpixel of second color in an odd row.

FIG. 9 illustrates a sampling area (illustrated by a dotted line box) of a subpixel of second color in an odd row. As illustrated in FIG. 9, the sampling area is a quadrangle. The division means of the sampling area is similar to the division means of the sampling area of the subpixel of first color in the even row as illustrated in FIG. 3. No further description will be given here. That is to say, a quadrangle, formed by the connection of midpoints of sloping sides of two subpixels adjacent to the target subpixel in the row direction, away from the target subpixel and midpoints of shared sloping sides of subpixels, adjacent to the target subpixel, in two pixel rows adjacent to the target subpixels, is selected as the sampling area.

Figure 10:
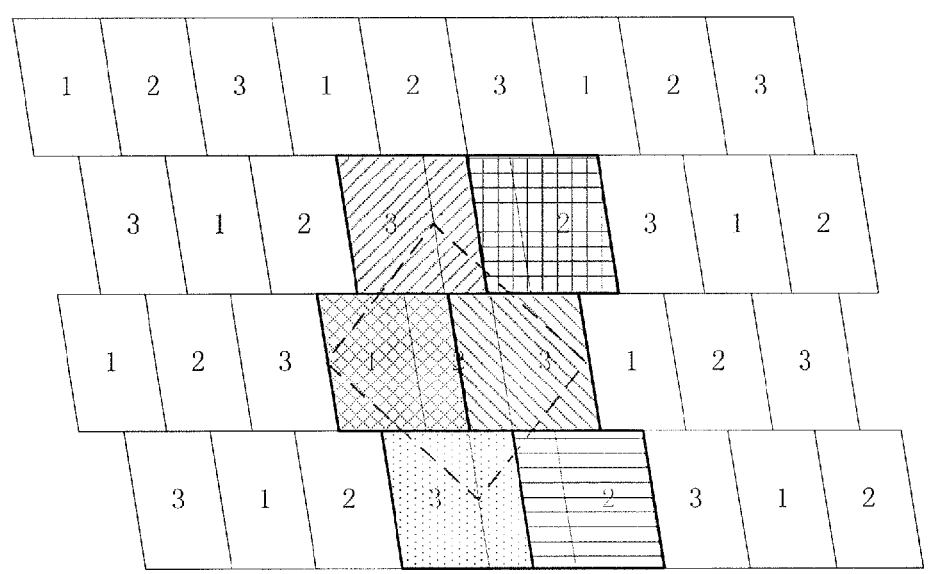
FIG. 10 is a schematic diagram of pixel units in the sampling area as illustrated in FIG. 9.

FIG. 10 is a schematic diagram of pixel units in the sampling area as illustrated in FIG. 9 (taking the case that one and a half subpixels are taken as one pixel unit as an example). As illustrated in FIG. 10, pixel units having overlapped areas with the sampling area are illustrated by heavy lines, in which different pixel units are filled with different patterns for distinguishing. Two pixel units are disposed in an adjacent row above the target subpixel; two pixel units are disposed in the row provided with the target subpixel; and two pixel units are disposed in an adjacent row beneath the target subpixel. Thus, as for the subpixel of second color in the odd row, 6 pixel units in total fall within the scope of the sampling area.

Figure 11:
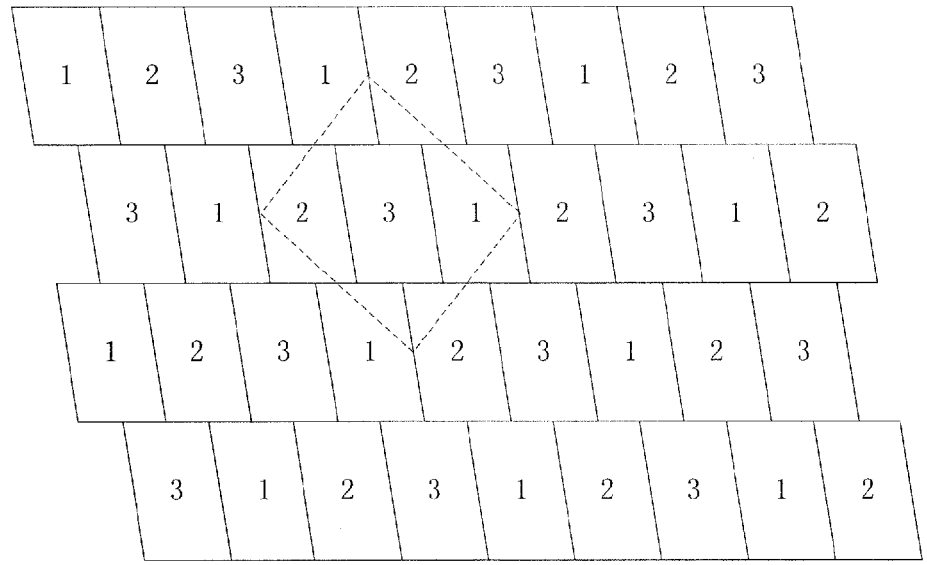
FIG. 11 is a schematic diagram of a sampling area of a subpixel of third color in an even row.

FIG. 11 illustrates a sampling area (illustrated by a dotted line box) of a subpixel of third color in an even row. As illustrated in FIG. 11, the sampling area is a quadrangle. The division means of the sampling area is similar to the division means of the sampling area of the subpixel of first color in the even row as illustrated in FIG. 3. No further description will be given here. That is to say, a quadrangle, formed by the connection of midpoints of sloping sides of two subpixels adjacent to the target subpixel in the row direction, away from the target subpixel and midpoints of shared sloping sides of subpixels, adjacent to the target subpixel, in two pixel rows adjacent to the target subpixels, is selected as the sampling area.

Figure 12:
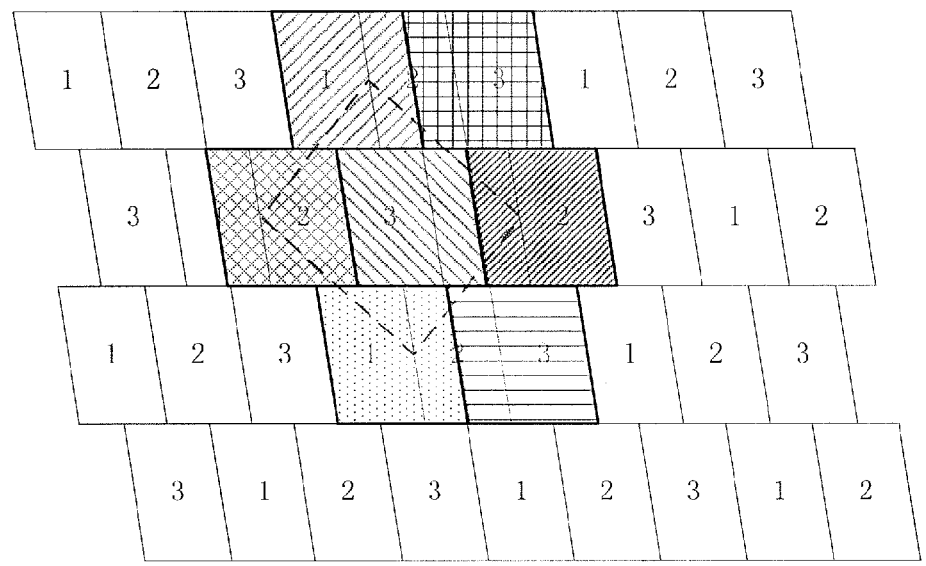
FIG. 12 is a schematic diagram of pixel units in the sampling area as illustrated in FIG. 11.

FIG. 12 is a schematic diagram of pixel units in the sampling area as illustrated in FIG. 11 (taking the case that one and a half subpixels are taken as one pixel unit as an example). As illustrated in FIG. 12, pixel units having overlapped areas with the sampling area are illustrated by heavy lines, in which different pixel units are filled with different patterns for distinguishing. Two pixel units are disposed in an adjacent row above the target subpixel; three pixel units are disposed in the row provided with the target subpixel; and two pixel units are disposed in an adjacent row beneath the target subpixel. Thus, as for the subpixel of third color in the even row, 7 pixel units in total fall within the scope of the sampling area.

Figure 13:
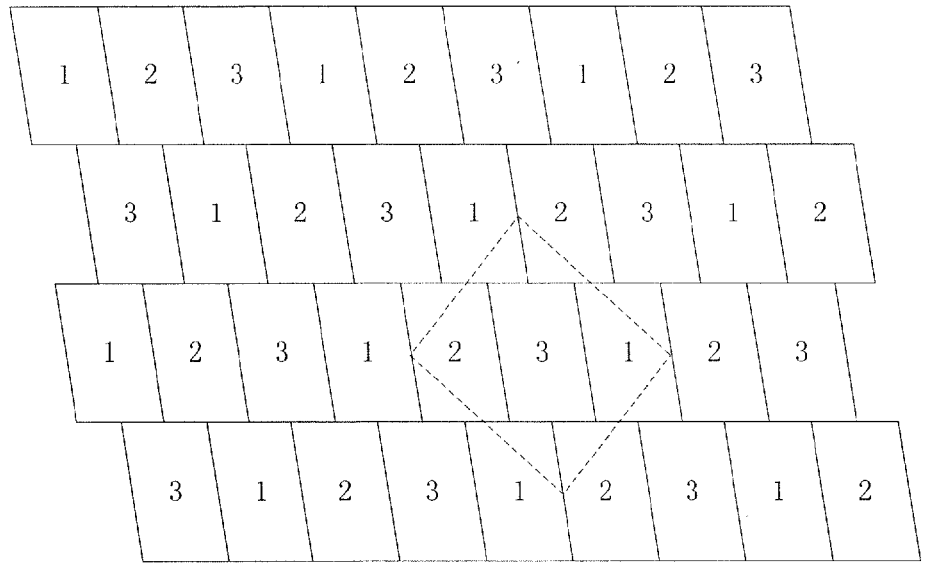
FIG. 13 is a schematic diagram of a sampling area of a subpixel of third color in an odd row.

FIG. 13 illustrates a sampling area (illustrated by a dotted line box) of a subpixel of third color in an odd row. As illustrated in FIG. 13, the sampling area is a quadrangle. The division means of the sampling area is similar to the division means of the sampling area of the subpixel of first color in the even row as illustrated in FIG. 3. No further description will be given here. That is to say, a quadrangle, formed by the connection of midpoints of sloping sides of two subpixels adjacent to the target subpixel in the row direction, away from the target subpixel and midpoints of shared sloping sides of subpixels, adjacent to the target subpixel, in two pixel rows adjacent to the target subpixels, is selected as the sampling area.

Figure 14:
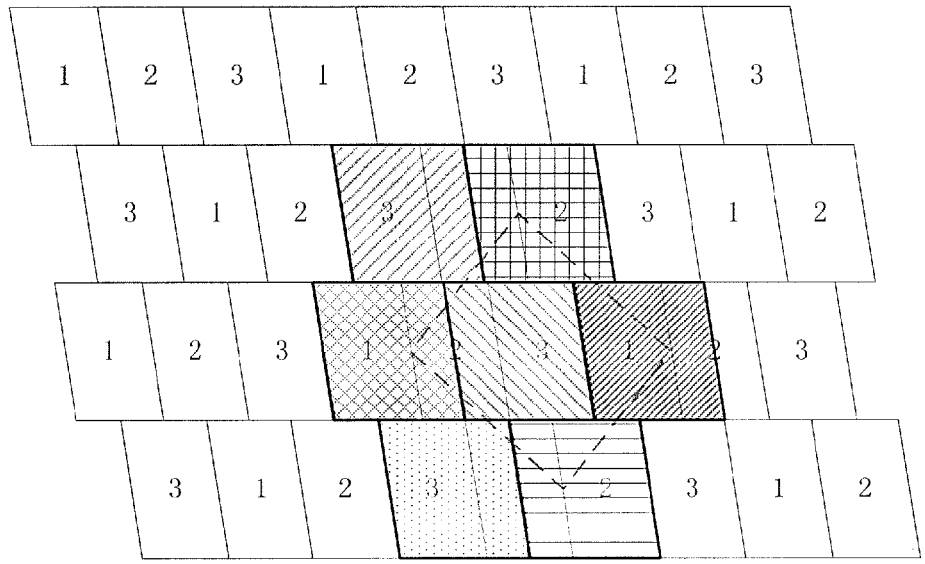
FIG. 14 is a schematic diagram of pixel units in the sampling area as illustrated in FIG. 13.

FIG. 14 is a schematic diagram of pixel units in the sampling area as illustrated in FIG. 13 (taking the case that one and a half subpixels are taken as one pixel unit as an example). As illustrated in FIG. 14, pixel units having overlapped areas with the sampling area are illustrated by heavy lines, in which different pixel units are filled with different patterns for distinguishing. Two pixel units are disposed in an adjacent row above the target subpixel; three pixel units are disposed in the row provided with the target subpixel; and two pixel units are disposed in an adjacent row beneath the target subpixel. Thus, as for the subpixel of third color in the odd row, 7 pixel units in total fall within the scope of the sampling area.

As described above, in the display method provided by the embodiment of the present invention, the sampling areas are divided in the form of quadrangles; and more pixel units adjacent to the target subpixel fall into the sampling area, so that the initial image information can be better recovered, and hence images can be better displayed in the pixel borrowing process. More importantly, the sampling area in the display method provided by the present invention is cooperated with the pixel array provided by the embodiment of the present invention in use. As described above, in the pixel array provided by the embodiment of the present invention, all the subpixels are inclined towards same direction, and the entire pixel array design adopts the delta arrangement mode. The quadrangular sampling area in the embodiment of the present invention is combined with the delta arrangement mode in the embodiment of the present invention, so that the subpixels in each sampling area can be more uniformly distributed. As for the division of the sampling areas in the pixel array provided by the embodiment of the present invention, the area ratio of the subpixels of each color in the sampling area is more uniform, and the subpixels of each color can be also more uniformly distributed in the sampling area. In this case, the color information of virtual pixels can be better recovered, and hence the image display quality can be improved.

Figure 15:
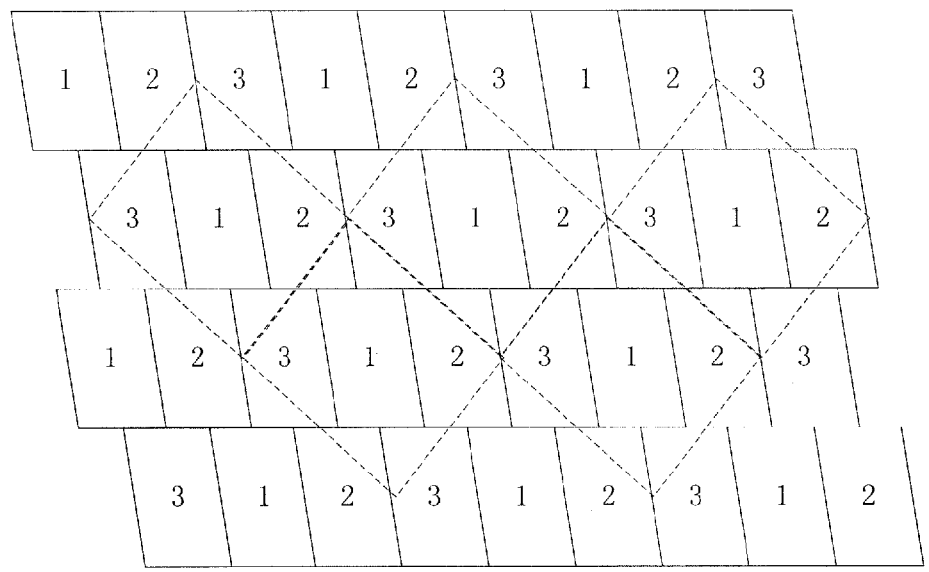
FIG. 15 is a schematic diagram illustrating the distribution of subpixels of frst color in the embodiment of the present invention.
Figure 16:
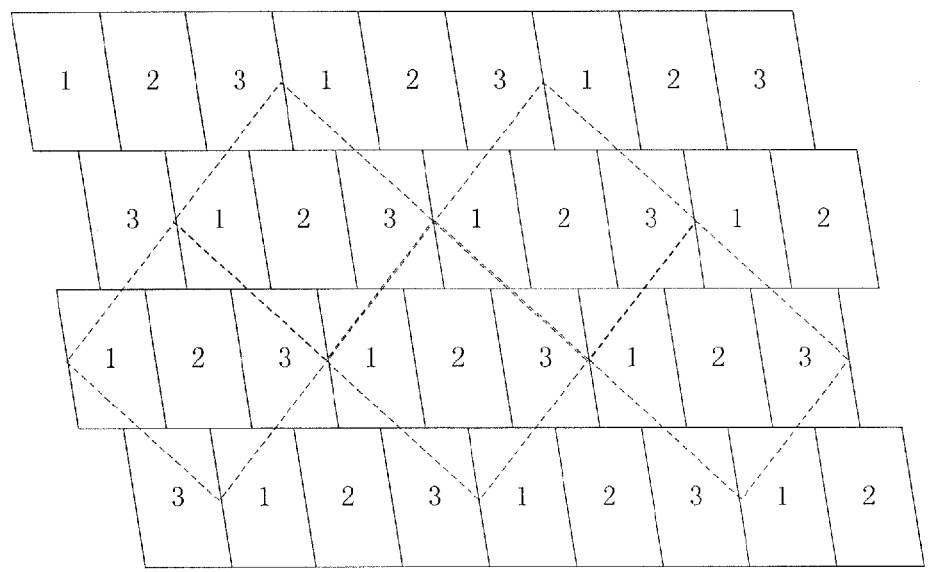
FIG. 16 is a schematic diagram illustrating the distribution of subpixels of second color in the embodiment of the present invention.
Figure 17:
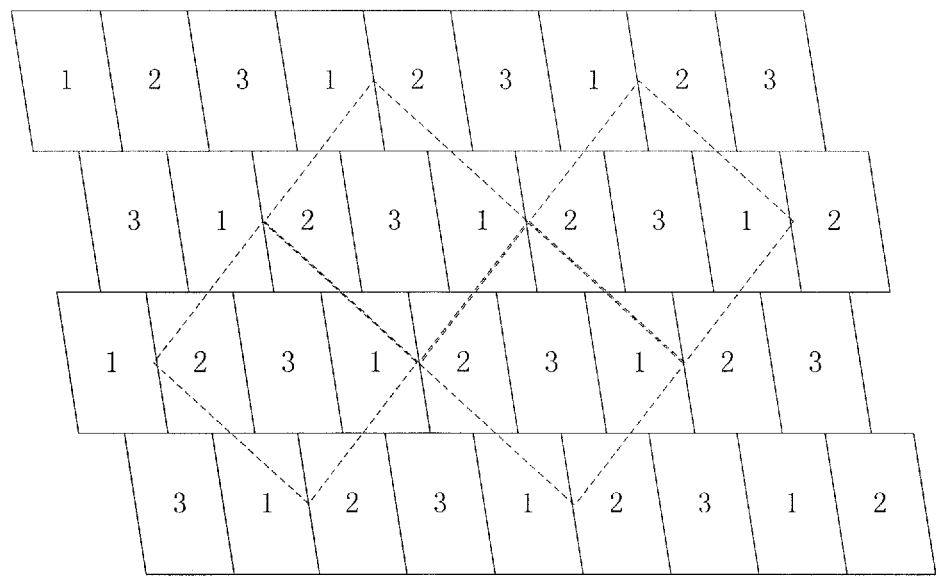
FIG. 17 is a schematic diagram illustrating the distribution of subpixels of third color in the embodiment of the present invention.

In addition, in the sampling area provided by the embodiment of the present invention, the subpixels of each color can all be continuously distributed in the pixel array. Thus, the initial image information can be better recovered. As illustrated in FIG. 15, sampling areas of subpixels of first color are continuously distributed, and no subpixel is left out in the middle. As illustrated in FIG. 16, sampling areas of subpixels of second color are continuously distributed, and no subpixel is left out in the middle. As illustrated in FIG. 17, sampling areas of subpixels of third color are continuously distributed, and no subpixel is left out in the middle. As seen from the above diagram, except edges of the pixel array, most intermediate regions of the pixel array can all be continuously covered by the subpixels of each color. As for subpixels at the edge, corresponding adjustment may be adopted according to sampling areas of intermediate pixels. For instance, the sampling area of the subpixel at the edge may be one part of the shape of the sampling area of the intermediate subpixel. For instance, the sampling area of the subpixel at the edge may be the shape obtained by drawing a sampling area by supposing the subpixel to be an intermediate subpixel and removing portions of the drawn sampling area exceeding the border of the pixel array.

Description will be given below to the method for displaying the pixel array provided by the embodiment of the present invention according to the division means of the sampling areas. In the display method, firstly, actual display information of each subpixel is calculated according to the display information allocated to pixel units in the pixel array. In the process of calculating the actual display information of the subpixel, the subpixel is selected as a target subpixel for the division of the sampling area, and subsequently, the actual display information of the target subpixel is calculated according to the area ratio of each pixel unit in the sampling area and the display information of a color the same as that of the target subpixel in each pixel unit.

Figure 18:
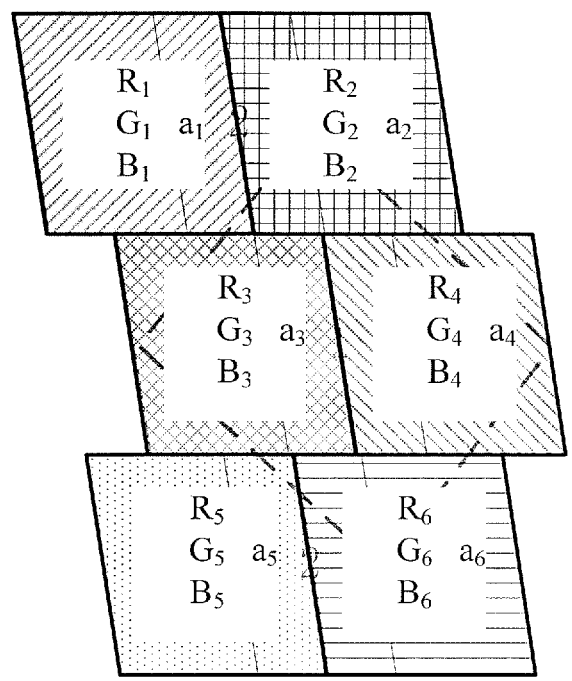
FIG. 18 is a schematic diagram illustrating pixel units relevant to a sampling area and display information thereof.

Herein, the calculation method of the actual display information of the subpixel of first color is described by taking the sampling area as illustrated in FIG. 4, namely the sampling area of the subpixel of first color in the even row, as an example. For the convenience of description, the sampling area is enlarged and illustrated in FIG. 18. As illustrated in FIG. 18, the serial numbers of the pixel units in the sampling area of the target subpixel from left to right and from the top down are the first pixel unit, the second pixel unit, the third pixel unit, the fourth pixel unit, the fifth pixel unit and the sixth pixel unit. R, G and B respectively represent the display information of red, green and blue in each pixel unit. In this way, the initial image information of the first pixel unit is $R_1$, $G_1$ and $B_1$, and the area of the first pixel unit falling into the sampling area is $a_1$; the initial image information of the second pixel unit is $R_2$, $G_2$ and $B_2$, and the area of the second pixel unit falling into the sampling area is $a_2$; the initial image information of the third pixel unit is $R_3$, $G_3$ and $B_3$, and the area of the third pixel unit falling into the sampling area is $a_3$; the initial image information of the fourth pixel unit is $R_4$, $G_4$ and $B_4$, and the area of the fourth pixel unit falling into the sampling area is $a_4$; the initial image information of the fifth pixel unit is $R_5$, $G_5$ and $B_5$, and the area of the fifth pixel unit falling into the sampling area is $a_5$; and the initial image information of the sixth pixel unit is $R_6$, $G_6$ and $B_6$, and the area of the sixth pixel unit falling into the sampling area is $a_6$.

Supposing that the target subpixel (the subpixel of first color) is a red subpixel, the actual display information $P_1$ of the red subpixel is:

$$P_1 = R_1 \frac{a_1}{A} + R_2 \frac{a_2}{A} + R_3 \frac{a_3}{A} + R_4 \frac{a_4}{A} + R_5 \frac{a_5}{A} + R_6 \frac{a_6}{A},$$

in which
$P_1$ refers to the actual display information of the subpixel of first color (red in the example) taken as the target subpixel; A refers to the area of the sampling area; $a_1$ to $a_6$ refer to the area of each pixel unit falling into the sampling area; and $R_1$ to $R_6$ refer to the red pixel display information of each pixel unit.

Description is given above by taking the case that the subpixel of first color is a red subpixel as an example. However, when the subpixel of first color is a blue subpixel, the actual display information of the target subpixel may be calculated by converting the position of $R_i$ in the formula into blue display information of the pixel unit; and when the subpixel of first color is a green subpixel, the actual display information of the target subpixel may be calculated by converting the position of $R_i$ in the formula into green display information of the pixel unit.

Similarly, the actual display information of the subpixel of second color and the subpixel of third color may be calculated according to methods which are the same with the method for calculating the actual display information of the subpixel of first color. No further description will be given here. Thus, the actual display information of all the subpixels in the pixel array (the sampling area of the subpixel at the edge of the pixel array may have different shapes with the above sampling area). As seen from the steps in the method for calculating the actual display information of the subpixel of first color, the formula of the method for calculating the display information of any subpixel is:

$$P = \sum_{i=1}^{n} p_i \frac{a_i}{A},$$

in which
P refers to the actual display information of the target subpixel; n refers to the number of pixel units in the sampling area; A refers to the area of the sampling area; $a_i$ refers to the area of each pixel unit falling into the sampling area; and $p_i$ refers to the image display information of same color with the target subpixel in each pixel unit (that is to say, refers to the red display information of each pixel unit if the target subpixel is a red subpixel, refers to the blue display information of each pixel unit if the target subpixel is a blue subpixel, and refers to the green display information of each pixel unit if the target subpixel is a green subpixel).

The display information here may be brightness or other appropriate data. The display method provided by the embodiment of the present invention may further comprise the step of applying display signals to the subpixels according to the calculated actual display information. After the display signals are applied to the subpixels, the initial image can be displayed. For instance, voltage corresponding to the actual display information may be applied to each target subpixel for image display. Thus, the image information in the virtual pixel unit can be converted into the actual display information of the actual subpixel, and the initial image can be displayed by utilization of the display information of the actual pixel, and hence the number of the subpixels can be reduced or the display resolution can be improved.

Thus, the display method provided by the embodiment of the present invention may comprise the following steps:
sequentially selecting a subpixel in a pixel array as a target subpixel;
selecting a quadrangle, formed by the connection of midpoints of sloping sides of two subpixels adjacent to the target subpixel in the row direction, away from the target subpixel and midpoints of shared sloping sides of subpixels, adjacent to the target subpixel, in two pixel rows adjacent to the target subpixels, to be a sampling area, in which the sampling area is overlapped with a plurality of pixel units; and
calculating the actual display information of the target subpixel according to the area ratio of each pixel unit in the sampling area and display information of the same color with the target subpixel in each pixel unit.

The selection method of the sampling area may refer to the above specific description. For instance, the calculation of the actual display information of the target subpixel in the sampling area may refer to the method and the formula for calculating the actual display information, described in the above embodiments. In addition, the display method provided by the embodiment of the present invention may further comprise the step of applying corresponding voltage to each target subpixel for image display after calculating the actual display brightness of each target subpixel. In addition, the display method provided by the embodiment of the present invention may be applied to the pixel array provided by the embodiment of the present invention. No further description will be given here to the pixel array.

The pixel array provided by the embodiment of the present invention and the display method thereof may be applied in various types of display devices, e.g., liquid crystal display (LCD) devices or organic light-emitting diode (OLED) display devices. The embodiment of the present invention further provides a display device, which comprises the pixel array provided by the embodiment of the present invention. In an LCD device, each subpixel may include components such as a pixel electrode, a common electrode, a liquid crystal layer and a thin-film transistor (TFT). In an OLED display device, each pixel may include components such as an anode, a cathode, an organic emission layer and a TFT. The structure of the subpixel herein may adopt various appropriate pixel structures. No special limitation is given here in the embodiment of the present invention. No further description will be given here. The display device provided by the embodiment of the present invention may adopt the above display method for display.

The foregoing is only the preferred embodiments of the present invention and not intended to limit the scope of protection of the present invention. The scope of protection of the present invention should be defined by the appended claims.

The application claims priority to the Chinese patent application No. 201510441016.0, filed Jul. 24, 2015, the disclosure of which is incorporated herein by reference as part of the application.

The invention claimed is:

1. A pixel array, comprising a plurality of pixel rows, each odd pixel row including subpixels of first color, subpixels of second color and subpixels of third color which are sequentially and repeatedly arranged, each even row including subpixels of third color, subpixels of first color and subpixels of second color which are sequentially and repeatedly arranged, wherein
each subpixel is of a parallelogram shape, in which two opposite bases are parallel to a row direction, and an angle between two opposite sloping sides and a direction perpendicular to the row direction is greater than 0 degree and less than or equal to 20 degrees; and
in adjacent pixel rows, a minimum distance of midpoints of bases of subpixels of a same color, close to a border between the adjacent pixel rows, along the row direction is greater than a width of one subpixel and less than or equal to a width of 3/2 subpixels, wherein the angle between each sloping side of each subpixel and the direction perpendicular to the row direction is 5-15 degrees.

2. The pixel array according to claim 1, wherein in the adjacent pixel rows, the minimum distance of the midpoints of the bases of the subpixels of the same color, close to the border between the adjacent pixel rows, along the row direction is the width of 3/2 subpixels or a width of 4/3 subpixels.

3. The pixel array according to claim 1, wherein the pixel array is divided into a plurality of pixel units, and each pixel unit includes one subpixel, one and a half subpixels adjacent to each other in the row direction, or two subpixels adjacent to each other in the row direction.

4. The pixel array according to claim 3, wherein each pixel unit includes one and a half subpixels, and for each subpixel, a ratio of a length of each base parallel to the row direction to a length of each sloping side is 1:1.5.

5. The pixel array according to claim 3, wherein each pixel unit includes two subpixels, and for each subpixel, a ratio of a length of each base parallel to the row direction to a length of each sloping side is 1:2.

6. The pixel array according to claim 3, wherein each pixel unit includes one subpixel, and for each subpixel, a ratio of a length of each base parallel to the row direction to a length of each sloping side is 1:1.

7. The pixel array according to claim 1, wherein the subpixels of first color, the subpixels of second color and the subpixels of third color have different colors which are respectively red, green and blue.

8. The pixel array according to claim 1, wherein the sides of the subpixels in the pixel array have a same inclined direction.

9. A display device, comprising the pixel array according to claim 1.

10. A display method of a display device, the display device including a pixel array which includes a plurality of pixel rows, each odd pixel row including subpixels of first color, subpixels of second color and subpixels of third color which are sequentially and repeatedly arranged, each even row including subpixels of third color, subpixels of first color and subpixels of second color which are sequentially and repeatedly arranged, wherein each subpixel is of a parallelogram shape, in which two opposite bases are parallel to a row direction, and an angle between two opposite sloping sides and a direction perpendicular to the row direction is greater than 0 degree and less than or equal to 20 degrees; in adjacent pixel rows, a minimum distance of midpoints of bases of subpixels of a same color, close to a border between the adjacent pixel rows, along the row direction is greater than a width of one subpixel and less than or equal to a width of 3/2 subpixels; and wherein,
the pixel array is divided into a plurality of pixel units, and each pixel unit includes at least one subpixel; and the display method comprises:
sequentially selecting a subpixel in the pixel array to be a target subpixel;
selecting a quadrangle, formed by connecting midpoints of sloping sides of two subpixels adjacent to the target subpixel in the row direction, away from the target subpixel and midpoints of shared sloping sides of subpixels, adjacent to the target subpixel, in two pixel rows adjacent to the target subpixel, to be a sampling area, in which the sampling area is overlapped with a plurality of pixel units; and
calculating actual display information of the target subpixel according to an area ratio of each pixel unit in the sampling area and display information with a color the same as that of the target subpixel in each pixel unit.

11. The display method according to claim 10, wherein in selecting the sampling area for the target subpixel, sampling areas of adjacent subpixels are partially overlapped.

12. The display method according to claim 10, wherein the actual display information of the target subpixel is calculated according to the following formula:

$$P = \sum_{i=1}^{n} p_i \frac{a_i}{A},$$

in which
P refers to the actual display information of the target subpixel; n refers to a number of pixel units in the sampling area; A refers to an area of the sampling area; $a_i$ refers to an area of each pixel unit falling into the sampling area; and $p_i$ refers to image display information with a color the same as that of the target subpixel in each pixel unit.

13. The display method according to claim 10, further comprising: after calculating the actual display information of each target subpixel, applying corresponding voltage to each target subpixel for image display.

14. The display method according to claim 10, wherein each pixel unit is allocated with display information of first color, display information of second color and display information of third color according to an image to be displayed.

15. The display method according to claim 14, wherein the display information of first color, the display information of second color and the display information of third color are respectively brightness of corresponding color.

16. The display method according to claim 10, wherein the subpixels of first color, the subpixels of second color and the subpixels of third color have different colors which are respectively red, green and blue.

17. The display method according to claim 10, wherein the actual display information of each subpixel in the pixel array, except subpixels disposed on an edge of the pixel array, is calculated according to the sampling area.

18. The display method according to claim 10, wherein each pixel unit includes one subpixel, one and a half subpixels adjacent to each other in the row direction, or two subpixels adjacent to each other in the row direction.

19. The display method according to claim 10, wherein the sides of the subpixels in the pixel array have a same inclined direction.

\* \* \* \* \*